(12) United States Patent
Turpin et al.

(10) Patent No.: US 7,062,174 B2
(45) Date of Patent: Jun. 13, 2006

(54) WAVELENGTH DIVISION MULTIPLEXING ADD-DROP MULTIPLEXER USING AN OPTICAL TAPPED DELAY LINE

(75) Inventors: Terry M. Turpin, Columbia, MD (US); Keith R. Frampton, Sykesville, MD (US)

(73) Assignee: Essex Corporation, Columbia, MD (US)

( * ) Notice: Subject to any disclaimer, the term of this patent is extended or adjusted under 35 U.S.C. 154(b) by 500 days.

(21) Appl. No.: 10/051,334

(22) Filed: Jan. 22, 2002

(65) Prior Publication Data
US 2003/0021525 A1    Jan. 30, 2003

Related U.S. Application Data

(60) Provisional application No. 60/263,306, filed on Jan. 22, 2001.

(51) Int. Cl.
*H04B 14/02* (2006.01)

(52) U.S. Cl. .......................................... 398/83; 398/88
(58) Field of Classification Search ................ 398/83, 398/84, 85, 86, 87, 88
See application file for complete search history.

(56) References Cited

U.S. PATENT DOCUMENTS

| | | | | |
|---|---|---|---|---|
| 5,457,758 A | 10/1995 | Snitzer | ........................ | 385/30 |
| 5,712,717 A | 1/1998 | Hamel et al. | ................ | 398/85 |
| 5,751,456 A | 5/1998 | Koonen | ...................... | 398/85 |
| 5,822,095 A * | 10/1998 | Taga et al. | .................... | 398/85 |
| 5,960,133 A | 9/1999 | Tomlinson | .................... | 385/18 |
| 5,999,320 A * | 12/1999 | Shirasaki | ..................... | 359/577 |
| 6,169,616 B1 | 1/2001 | Cao | .............................. | 398/9 |
| 6,285,478 B1 | 9/2001 | Liu et al. | ....................... | 398/9 |
| 6,288,810 B1 | 9/2001 | Grasso et al. | ................. | 398/9 |
| 6,289,148 B1 | 9/2001 | Lin et al. | ..................... | 385/24 |
| 6,292,299 B1 | 9/2001 | Liou | ........................ | 359/583 |
| 6,310,994 B1 | 10/2001 | Jones et al. | ................... | 385/24 |
| 6,434,291 B1 * | 8/2002 | Kessler et al. | ................ | 385/24 |
| 2001/0030786 A1 | 10/2001 | Takahashi et al. | ............ | 398/82 |
| 2001/0038734 A1 | 11/2001 | Kim et al. | .................... | 385/24 |

FOREIGN PATENT DOCUMENTS

WO    WO 99/38348    7/1999
WO    WO 01/46731 A2    6/2001

OTHER PUBLICATIONS

Yoon et al. "A Tunable Optical Add/Drop Multiplexer Using a Fiber-Optic Tapped Delay-Line Transversal Filter" IEEE Aug. 1999, pp. 785-786.
Shiraski "Virtually Imaged Phased Array" Fujitsu Sci. Tech. Journal vol. 35, No. 1, Jul. 1999, pp. 113-125.

\* cited by examiner

*Primary Examiner*—Christina Y Leung
(74) *Attorney, Agent, or Firm*—Morrison & Foerster LLP

(57) ABSTRACT

An Optical Tapped Delay Line (OTDL) is combined with other known optical apparatuses to provide an add-drop multiplexer for a wavelength division multiplexing fiber optic network. Each output beam of the OTDL is spatially distinguishable in free space. This wavelength accessibility enables selection of one or more of the optical beams for adding or dropping. The system can be a fixed or tunable single channel add/drop system, a fixed or tunable multi-channel add/drop system, or a fully programmable add/drop system.

22 Claims, 5 Drawing Sheets

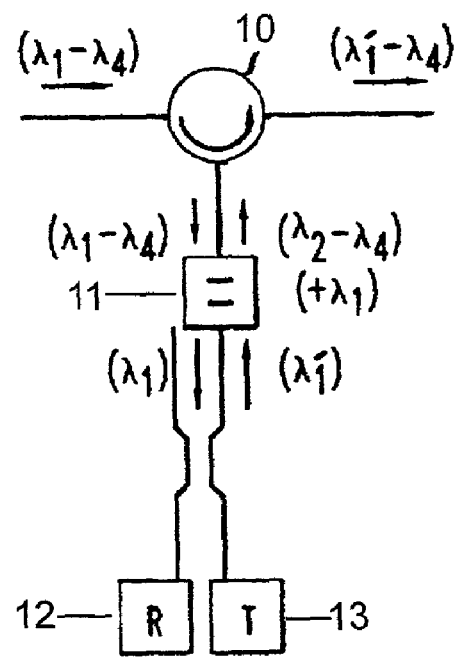
Figure 1 – Prior Art
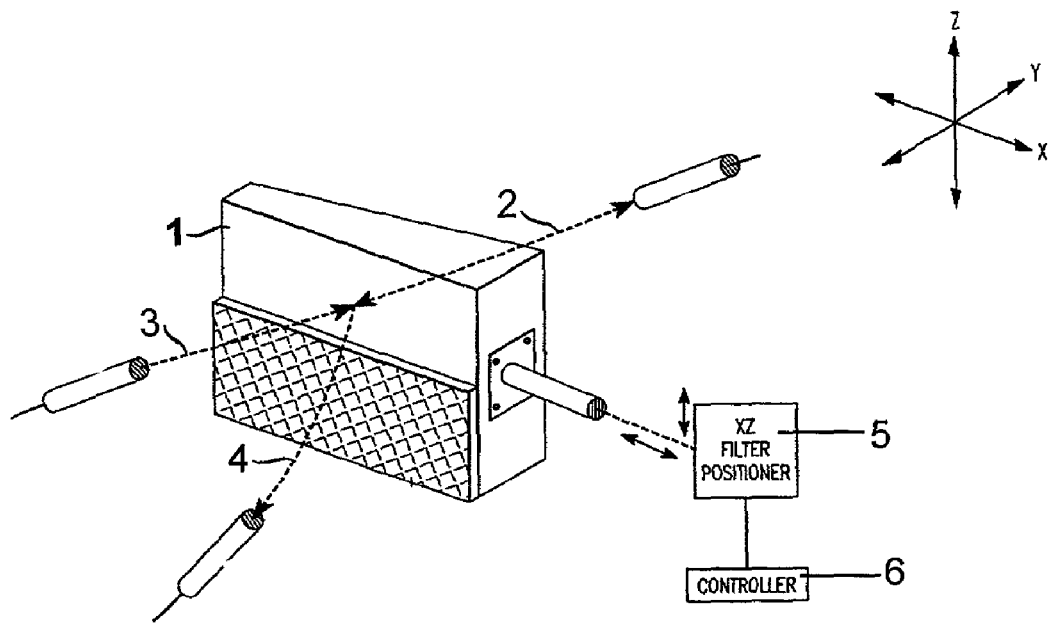
Figure 2 – Prior Art

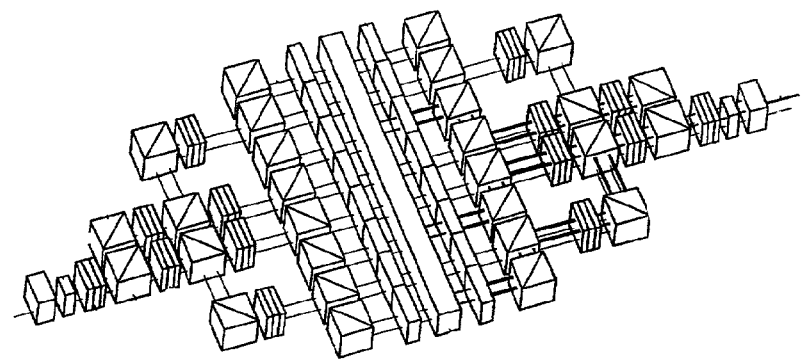
Figure 3 – Prior Art
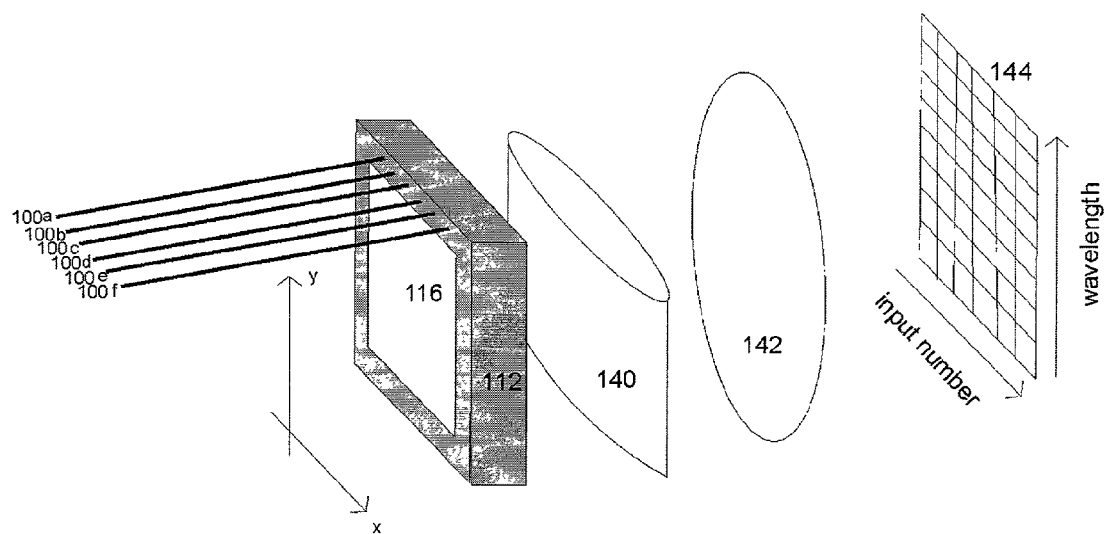
Figure 4

WAVELENGTH DIVISION MULTIPLEXING ADD-DROP MULTIPLEXER USING AN OPTICAL TAPPED DELAY LINE

FIELD OF THE INVENTION

The present invention relates to fiber optic networks and the use of wavelength division multiplexing and dense wavelength division multiplexing techniques and, more specifically, to fiber optic wavelength add/drop systems.

BACKGROUND OF THE INVENTION

Wavelength division multiplexing (WDM) enables different wavelengths to be simultaneously carried over a common fiber optic waveguide. Each wavelength or light beam carries encoded data. WDM can separate the fiber bandwidth into multiple discrete channels with narrow channel spacing through a technique referred to as dense wavelength division multiplexing (DWDM). This technique provides a relatively low-cost method of substantially increasing long haul telecommunication capacity over existing fiber optic transmission lines.

Techniques and devices are required for multiplexing the discrete wavelengths in DWDM transmission systems. In other words, the individual optical signals must be combined onto a common fiber optic waveguide. Then, the optical signals must be separated again into the individual signals or channels at the opposite end of the fiber optic cable. Thus, the ability to effectively combine and then separate individual wavelengths (or wavelength bands) from a broad spectral source is of significant importance to the fiber optic telecommunications field. Similarly, this technique is important in many other fields employing optical networking devices.

Devices that couple multiple, closely-spaced carrier wavelengths within a single optical fiber are called multiplexers. Devices that separate the carrier wavelengths at the receiving end of a fiber are called demultiplexers or channelizers.

As fiber optic transmissions enter and leave metropolitan and local area networks (LANs), each data-carrying wavelength is usually switched through various points along the fiber optic network. These points are known as "nodes." At node locations, optical signals can be forwarded to the next node or "dropped" towards their final destination via the best possible path. The best possible path may be determined by such factors as distance, cost, and the reliability of specific routes. In addition, specific data-carrying wavelengths may be recombined or "added" to the multiplexed optical signal at node sites. The devices that perform these functions in DWDM network systems are called add/drop multiplexers (ADMs).

The conventional way to drop a data signal from a DWDM fiber is to de-multiplex the signal into its constituent wavelengths. Next, the light is detected using a photodetector, thus converting the signals to an electronic form (OE conversion). The electronic signal is switched and/or routed, as appropriate. The remaining signals are converted back to an optical signal (EO conversion). The optical signal is then sent down the proper fiber. During this last step, a signal can be added to the remaining signals. Such OE and EO conversion operations are both protocol and data rate dependent. These operations also require inflexible devices that are costly and difficult to upgrade as system capacity demand is increased.

Optical add/drop multiplexers (OADMs) have several significant advantages. First, OADMs cost less because they eliminate the need for much of the expensive high-speed electronics in conventional devices. Second, OADMs require smaller packaging because removing the electrical conversion step results in a reduced component count within the switches. Finally, optical devices are relatively future-proof because the optics can accommodate any bit-rate, whereas electrical devices must always be customized for the bit-rate and protocol of the signals.

Optical add/drop systems are comprised of two major subsystems. The first subsystem is the demultiplexing and multiplexing subsystem for selecting and recombining the appropriate wavelength. The second subsystem is the add/drop apparatus for routing the wavelength to the desired optical fiber output. Existing techniques for wavelength separation from a multiplexed signal using optical architectures include thin film bandpass filters, Fabry-Perot filters, fiber Bragg or diffraction grating filters, and polarization controllers. Each of these optical filtering methods may have different forms.

Thin film bandpass filters have traditionally been used in OADM devices to select single wavelengths from a multi-channel optical signal. Although such filters have good channel isolation, they tend to exhibit a transmission light loss of approximately 10%. Such filters are also highly temperature-sensitive. Further, they often operate in only one direction. In addition, such filters are limited to a single, fixed wavelength. Thus, to construct a multi-channel OADM device, multiple filters must be combined. This results in increased complexity, optical loss, and cost.

In U.S. Pat. No. 5,751,456, Koonen disclosed an example of a solution to some of these issues wherein a narrow-bandpass Fabry-Perot filter was utilized in a bidirectional OADM. As Fabry-Perot filters can have a bandpass of 1–2 nm or less, they can provide better isolation and lower loss factors than other thin film interference filters. FIG. 1 illustrates an example of the Koonen prior art. The device illustrated in FIG. 1 is limited in that it can add/drop only a single wavelength. As illustrated in this example, a circulator 10 is used to pass four wavelengths $\lambda_1$–$\lambda_4$ to a Fabry-Perot filter 11. Filter 11 selects one wavelength $\lambda_1$ for continuation on to a receiver 12. The remaining wavelengths $\lambda_2$–$\lambda_4$ are reflected by the filter 11 back to a circulator 10. A transmitter 13 sends a new wavelength $\lambda_1'$ to the filter 11. The new wavelength $\lambda_1'$ is multiplexed with the original wavelengths $\lambda_2$–$\lambda_4$. The resulting wavelength is returned to the circulator 10 for continuation The issue of such interference filter-based ADM devices being fixed in nature has been addressed in the prior art with the invention of "tunable" filters. Tunable filters can be selectively tuned to different wavelengths within a multi-channel optical signal. However, tuning thin-film optical filters requires that either the incident optical beam be repositioned with respect to the filter surface or that the filter itself be repositioned with respect to the input beam. Both scenarios require mechanical movement of components. These components include as actuators or stepper motors. The mechanical movement of these components makes these OADM devices active in nature. This results in increased complexity and cost.

FIG. 2 illustrates an example of a prior art tunable filter as disclosed in U.S. Pat. No. 6,292,299. FIG. 2 illustrates the mechanical nature of selecting a single wavelength. FIG. 2 also illustrates the potential complexity of matching the add/drop wavelengths to output fibers. An electronic controller 6 directs an optical filter 1 to move in the x and z directions to a specific location where a single wavelength from an incoming fiber 3 is intercepted. Once selected, the wavelength is passed or dropped to a fiber 2. The unselected wavelengths are reflected to continue on a fiber 4. A wavelength can be added from fiber 2 at the same time. As can be seen from the example illustrated in FIG. 2, the electronic controller must be mechanically manipulated to select a single wavelength.

Diffraction gratings and fiber Bragg grating filters (FBGs) offer alternative means of selecting and isolating single wavelengths from a multi-channel input beam in OADM devices. Diffraction gratings can be used in an OADM device to separate an input beam into its components in one direction, and recombine the wavelengths in the reverse direction. However, with diffraction grating systems, the component count can rise rapidly. Lenses, collimators, and focusing optics are required to refine, direct, and couple the light beams into fibers.

Because FBGs are constructed from optical fibers, rather than individual thin-film filter substrates, they allow for all-fiber systems to be constructed. Fiber Bragg grating systems offer high levels of selectivity. However, they are limited in that several fiber gratings must be combined, along with optical circulators, in order to handle a multiplexed optical signal with a high channel count. The result can be a very large device with a high component count, increased complexity, and a higher cost. In addition, the combination or cascading of multiple-fiber Bragg gratings can significantly reduce signal strength as the insertion loss of multiple devices is compounded throughout the system.

A recent development in the area of wavelength selectivity and separation of multiplexed optical signals has been the utilization of polarization controllers. As disclosed by U.S. Pat. No. 6,285,478, polarization-controlling elements can also be used within OADM devices to separate a multi-channel WDM input signal into odd and even channels. This is done, for example, by splitting the signal into its vertically and horizontally polarized components. When combined with birefringent beam displacing optics, the separated signals can then be directed to appropriate output paths. This method provides an add/drop device that can accommodate the high channel counts and narrow channel spacing of current DWDM networks, where channels are separated by 50 GHz or less. This channel-separation technique is expandable and can adapt to increasing channel counts. However, this technique is subject to very high optical component count. Included in the optical component count are multiple polarization controllers, birefringent elements and beam splitters. These components are required to manipulate dense multiplexed signals. Assembling and aligning these optical components within a device can be extremely expensive. This is particularly true when high levels of precision are required. FIG. 3 illustrates an example of the prior art. FIG. 3 illustrates an example of the large number of components required to separate eight-channels.

With the continued development of WDM fiber optic systems, it is becoming increasingly important to control the direction of wavelengths to desired output ports (i.e., routers). It is likewise important to permit a new signal to replace an existing signal at a specific wavelength (i.e., add/drop) using optical systems. Furthermore, since the development of DWDM sends hundreds and even thousands of wavelengths through a fiber, the ability to selectively control a single or several wavelengths without affecting the other wavelengths is very important. This ability is important because the optical to electrical to optical conversion process is expensive and uses significant power as well as space. In particular, optical add/drops are critical components in WDM regional-access ring or bus networks to provide broadband access to users.

Current optical subsystems that perform add/drop functions include mirrors and micro-electro-mechanical systems (MEMS) using movable and fixed mirrors and etalons.

In the prior art, it is known to use a reconfigurable switching matrix having front and back micromirrors. These micromirrors are a reconfigurable switching matrix capable of directing the output of wavelengths in multiple directions.

It is also known in the art to use a tunable optical add/drop that employs an optical filter device, such as a multi-layer dielectric wedge filter. This technique is successful using tunable Mach-Zehnder interferometers, acoustic tuning filters, tunable thin film interference filters, tunable Fabry-Perot etalons, and tunable Fabry-Perot interferometers. However, it is only possible to interact with a single wavelength at one time using this technique.

A wedged etalon with an actuator that moves the etalon to the position of the channel to be added or dropped may also be employed. However, this system can only accommodate adding or dropping a single channel simultaneously. Further, the added or dropped channel must be at the same frequency.

Accordingly, in light of the limitations of the prior art, it is desirable to have an optical add/drop system which is simpler then those known in the art, has low optical loss characteristics, operates on single or multiple channels, and is capable of adding or dropping finely-spaced channels with separations as close as 50 MHz.

SUMMARY OF THE INVENTION

Accordingly, an embodiment of the present invention provides an optical add/drop system for a wavelength division multiplexing fiber optic transmission system. More specifically, an embodiment of the present invention combines an Optical Tapped Delay Line (OTDL) with a subsystem to perform the adding or dropping of single or multiple wavelengths from an optical fiber.

The OTDL component of an add/drop system in accordance with one aspect of the present invention enables the simultaneous channelization of hundreds of discrete input beams into their constituent frequency components at independent spatial locations. Each of the output beams is a function of the frequency components of the corresponding input beams. The spatial separation of each wavelength enables the present invention, in this embodiment, to simultaneously add or drop one or more wavelengths from one or more input beams. Accordingly, this embodiment does not rely on grating and filters, which can only select single wavelengths and are not capable of dynamically selecting one or more wavelengths.

An OTDL can perform de-multiplexing and multiplexing even when the WDM channels are closely spaced. One evolutionary path of WDM is to pack more wavelengths into the same fiber using narrower channel spacings and bit rates such as 2.5 and 10 gigabits per second. Adding or dropping these narrowband channels using filters or grating technologies becomes very difficult or impossible. However, embodiments of the present invention do not rely on grating or filters. Therefore, these embodiments of the invention are capable of separating channels for adding or dropping even when the spacing between wavelengths is as narrow as 50 MHz (i.e., 0.4 pm at 1550 nm). More specifically, the spacing between wavelengths can be between 25 GHz and 50 MHz, for example.

According to one embodiment of the invention, once the wavelengths have been separated, a separate subsystem performs the adding and/or dropping of the wavelengths. This add/drop subsystem may include a mirror with a hole or a microelectro-mechanical system. Other known methods of adding and/or dropping wavelengths may be used.

According to an embodiment of the invention, a mirror with a hole may be used to add/drop the wavelengths. The location of the hole is at the same spatial location as the spatial location of the target wavelength. The target wavelength preferably passes through the hole, is coupled to a fiber and then is passed to an optical device, such as a circulator, for continuation on another fiber optic path. The target wavelength may also be passed on to a detector for conversion to an electronic form. According to an embodiment of the invention, to select multiple wavelengths, there can be multiple holes in the mirror at pre-determined locations. To dynamically select a wavelength, for example, the mirror can move up or down to position the hole or holes at the target wavelengths.

According to another embodiment of the invention, a Micro-Electro-Mechanical System (MEMS) with micromirrors may be utilized for the add/drop subsystem. The micro-mirrors are preferably positioned at the spatial location of every output light beam. To select one or more channels, one of the micro-mirrors is preferably canted at an angle to reflect the target wavelength to a fiber/circulator or detector for adding and dropping the information carrier to another destination.

BRIEF DESCRIPTION OF THE DRAWINGS

A detailed description of some preferred embodiments of the present invention will be made with reference to the accompanying drawings, in which:

FIG. 1 illustrates an example of a prior art narrow-bandpass Fabry-Perot filter utilized in a bi-directional OADM;

FIG. 2 illustrates an example of a prior art tunable filter;

FIG. 3 illustrates an example of a prior art method of polarization controlling elements used to separate a multi-channel WDM input signal into odd and even channels;

FIG. 4 is a perspective view of an example of a two-dimensional OTDL according to an embodiment of the invention;

DESCRIPTION OF THE PREFERRED EMBODIMENTS

Figure 5:
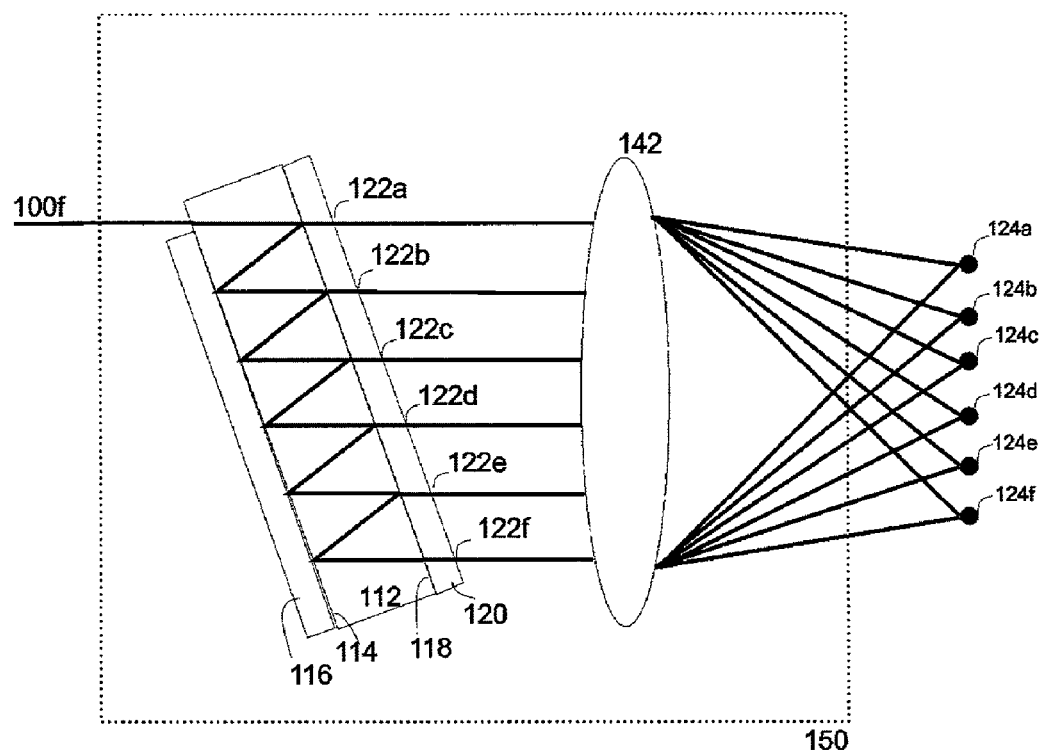
FIG. 5 is a side view of one input beam of an example of an OTDL according to an embodiment of the invention.

FIGS. 4 and 5 illustrate an example of an OTDL device according to an embodiment of the invention. As illustrated in FIG. 4, six collimated input beams $100(a)$–$100(f)$ preferably enter an optical cavity 112. The optical cavity 112 may be a transparent plate having a desired thickness. The thickness of the cavity determines the free spectral range (FSR) of the device, i.e., the optical frequency ambiguity, or the optical frequency difference of wavelengths that appear at the same wavelength location in plane 144 as illustrated, for example, in FIG. 5. The origin of the beams may be, for example, the collimated outputs of six optical fibers (not shown) where each fiber typically carries multiple wavelength channels. The cavity 112 preferably has a first surface 114 that may be provided with a coating 116, which is substantially 100% reflective. The coating 116 preferably covers the majority of the surface 114 with the exception of a transparent window where the input beams $110(a)$–$(f)$ enter the device. The cavity 112 preferably has a second surface 118 that is opposed to the first surface 114. The second surface 118 is preferably provided with a coating 120 that is partially reflective.

According to an embodiment of the invention, the partial reflectivity of the second surface coating 120 is spatially varying. In another embodiment, which is not illustrated, the partial reflectivity of the second surface coating 120 may be substantially uniform.

The reflective surface coatings 116 and 120 are preferably on opposite sides of the optical cavity 112. The optical cavity 112 may be made of glass, other transparent materials or empty space.

The various output beams may then be directed to an anamorphic optical system that is preferably spaced apart from the optical cavity 112. In the illustrated embodiment, the anamorphic optical system comprises a cylinder lens 140 and a spherical lens 142. The anamorphic optical system 140,142 preferably performs a Fourier transformation of the output of the cavity 112 in the vertical dimension y, and images the output of the cavity 112 in the horizontal dimension x onto an output surface 144. Although not illustrated in FIG. 4, it will be recognized that the optical system 140, 142 may have some form other than anamorphic, as described above, depending on the particular application of the OTDL device.

FIG. 5 illustrates an operational side view of an example of the device shown in FIG. 4. The single input beam $100(f)$ illustrated in FIG. 5 corresponds to the input beam $100(f)$ illustrated as one of the multiple input beams $100(a)$–$(f)$ in FIG. 4. Although not illustrated in FIG. 5, it will be understood that the other multiple input beams $100(a)$–$(e)$ reside behind the input beam $100(f)$ in the view shown in FIG. 5. It will also be understood that the device of this embodiment is capable of processing and channelizing all of the multiple input beams simultaneously.

Referring to FIG. 5, the input beam $100(f)$ preferably enters the cavity 112 as a collimated beam of light. After entering the cavity 112, a portion of the collimated input beam may exit the cavity at a first location or "tap" $122(a)$ as a collimated output beam. Another portion of the collimated input beam may be partially reflected by the coating 120 and then totally reflected by the coating 116. In other words, a portion of the beam "bounces" from the coating 120 to the coating 116 and then back again. This reflection or "bounce" produces a collimated output beam that preferably exits at a second location or tap $122(b)$. Tap $122(b)$ may be slightly displaced spatially from the first tap $122(a)$. As a result of the bounce, the distance traveled by the output beam $122(b)$ may be greater than the distance traveled by output beam $122(a)$. The width of the optical cavity 112 between reflective surfaces 116 and 120 may thereby introduce a time delay between adjacent taps. The reflective process continues, thereby preferably producing multiple additional collimated output beams $122(a)$–$(f)$. The result may be a series of output beams that are distributed in the y-direction with a progressive time delay from beam to beam.

Although not illustrated in FIG. 5, it will be recognized that a similar series of output beams distributed in the y-direction may be simultaneously produced for each one of the input beams $100(a)$–$(f)$. In other words, the device of this embodiment may be capable of operating on each one of the multiple collimated input beams independently of the other input beams. The device of this embodiment may therefore be referred to as a "two-dimensional" device. This is due to the fact that the device uses two different spatial dimensions to perform signal processing functions. A first dimension x preferably accommodates multiple independent collimated input beams that are all independently channelized along a second dimension y.

The various beams remain substantially collimated throughout the reflective process. Divergence of the beams and interference among the beams is minimized. Numerous internal reflections within the cavity 112 may be achieved without substantial divergence or interference.

Beam $122(a)$ may pass through a lens system 142 performing the Fourier transform. Beam $122(a)$ may illuminate the entire plane at 124. Similarly, all of the remaining beams $122(b)$–$(f)$ may pass through 142 and illuminate the entire plane at 124. The totality of beams illuminating plane 124 may create an interference pattern which will preferably coalesce a single wavelength at $124(a)$, a separate wavelength at $124(b)$ and, similarly, at $124(c)$–$(f)$. It will be understood that the number of wavelengths collected at plane 124 does not need to equal the number of beams exiting at plane 122. The continuous spectrum will preferably be generated at plane 124 and the discrete wavelengths will be present only if discrete wavelengths, or more accurately, narrow wavelength bands, are present in the input beam $100(f)$.

In FIG. 5, the OTDL subsystem of the present invention is represented as element 150. Future references to 150 are intended to represent all of the functions illustrated within the area labeled 150 in FIG. 5.

Figure 6:
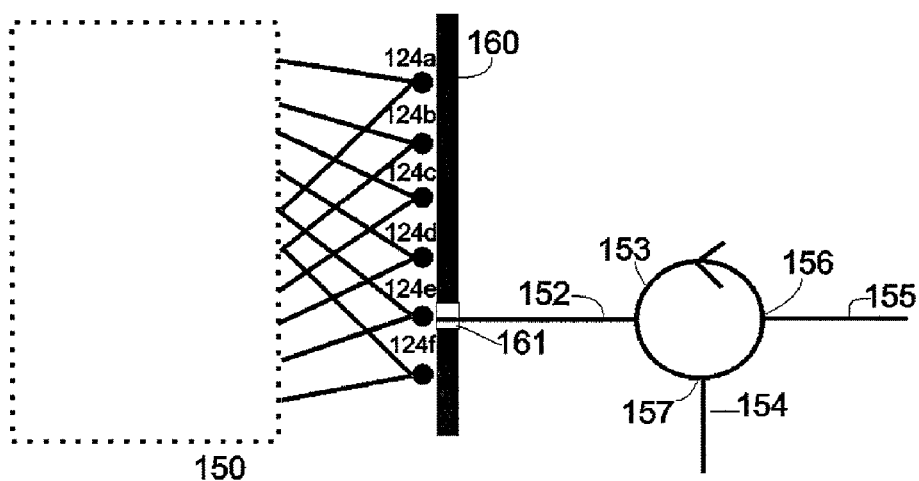
FIG. 6 is a side view of an example of a single mirror according to an embodiment of the present invention.

The output surface 144 shown in the example illustrated in FIG. 6 is two-dimensional. The horizontal dimension x of the output surface 144 may correspond to the input beam index. The vertical dimension y may correspond to the wavelength of the light in the input beam. There are a wide variety of devices that might be positioned at the output surface 144 to enable adding and dropping of a specific wavelength.

Referring to FIG. 6, a mirror 160 is preferably provided with a hole 161. It should be understood that the location of the hole 161 may be at any of the output beam locations in any of the two dimensions. The separated wavelengths $124(a)$–$(f)$ may strike the mirror 160, except at the location of the hole 161. Those wavelengths not striking the area where the hole is located are preferably reflected back into the OTDL device 150. The wavelength striking the hole; i.e., $124(e)$ in this example, passes through and is preferably collected by a properly coupled fiber (e.g., with lenslet, waveguide, or other technique). This wavelength then preferably passes through a circulator 153, for example. Then, the wavelength may be passed to a drop fiber 154. The optical signal to be inserted at the same wavelength; i.e., the added channel 155, is preferably coupled to the input port 156 of the circulator 153 and passed back to the hole 161 in the mirror 160. It should be noted that the piece of fiber 152 between the hole 161 and the circulator 153 may carry both the dropped channel propagating left to right and the added channel propagating right to left. The added wavelength is then passed back through the OTDL 150 coupled to the output fiber 154. The output fiber 154 now carries all of the original wavelengths. However, the information on the added/dropped wavelength is now different.

In alternative embodiments of the invention, a wavelength may be dropped without being re-added. Further, an unused wavelength may be added without being dropped. Similarly, a wavelength may be dropped and the same information added back at the same wavelength if desired; i.e., a broadcast mode.

This above-described embodiment of the invention relates to a single fixed wavelength add/drop. If two or more holes are present in the mirror 160, then multiple fixed wavelengths may be added/dropped. If the mirror is movable such that the hole can be moved to any wavelength position, then the device is a tunable single channel add/drop demultiplexer. If the movable mirror has multiple holes, then it is a ganged wavelength tunable add/drop demultiplexer. The mirror movement/tuning may be manual (e.g., field settable) or automated.

Figure 7:
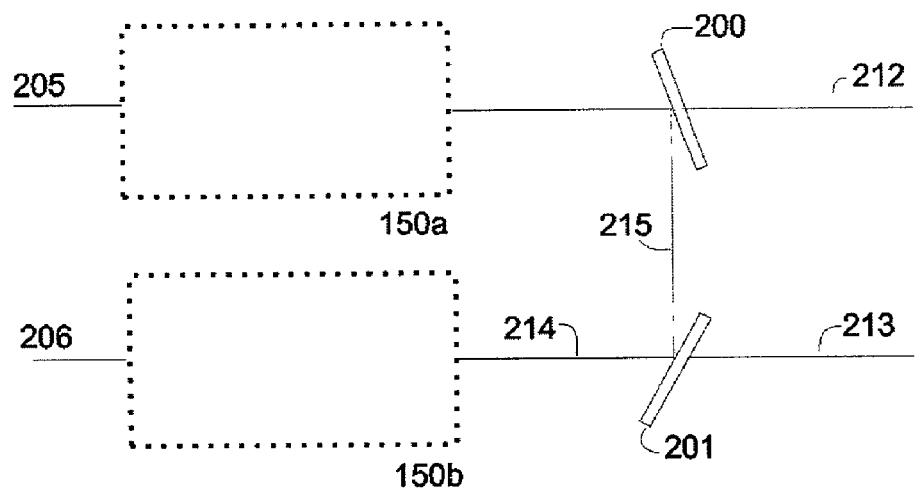
FIG. 7 is a top view of an example of a double mirror according to an embodiment of the invention.

FIG. 7 is a top view of an example of a double mirror according to an embodiment of the invention. The embodiment illustrated in FIG. 7 utilizes two mirrors instead of one, as shown in the example illustrated in FIG. 6, and two OTDL channels (which may or may not be on the same device) instead of one.

Referring to FIG. 7, an input beam preferably enters an OTDL $150(a)$ at 205 for de-multiplexing. After being separated into their respective wavelengths by the OTDL $150(a)$, the wavelengths preferably arrive at mirror 200. The mirror 200 has at least one hole (not shown) at the appropriate spatial location of the respective wavelength to be dropped. The wavelength, such as $124(e)$, preferably passes through the hole for coupling to another fiber or to a detector. All wavelengths not passing through the hole or holes in mirror 200 are reflected to mirror 201 along path 215. The mirror at 201 can also include a hole or a plurality of holes for adding new wavelengths. The optical signal carrying the frequency to be added preferably arrives at mirror 201 on a beam(s) at the proper wavelength(s) and passes through one or more holes in mirror 201. Next, the beam(s) preferably continue on to the OTDL $150(b)$ for multiplexing, i.e., recombining with the other wavelengths for output to a fiber at 206. According to this embodiment, the adding/dropping is performed without the use of a circulator.

Figure 8:
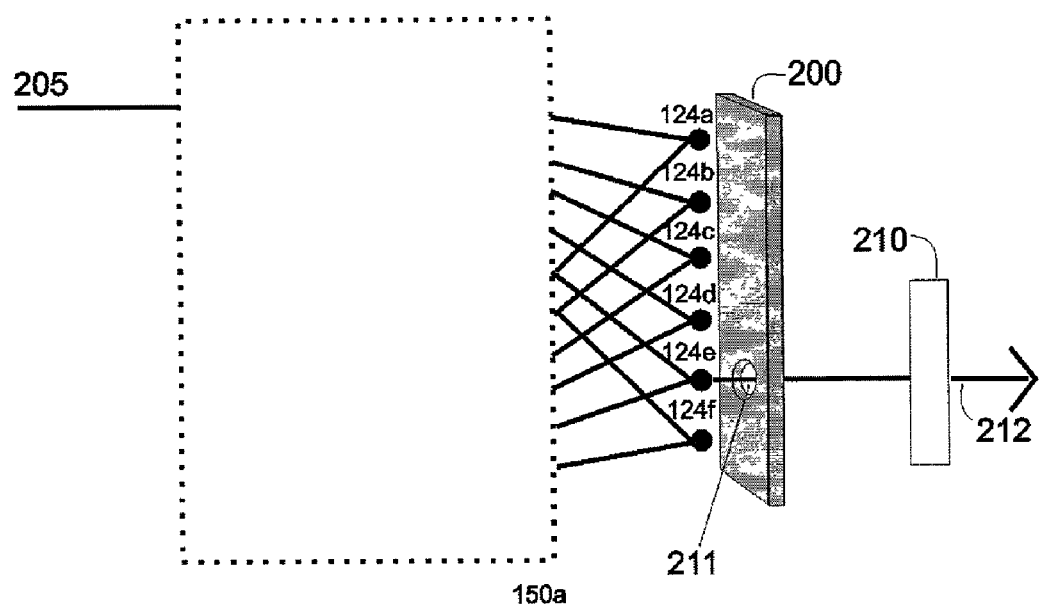
FIG. 8 is a side perspective view of an example of a de-multiplexer side of a double mirror according to an embodiment of the invention.

FIG. 8 is a side perspective view of an example of the de-multiplexer side of a double mirror according to an embodiment of the invention. More specifically, FIG. 8 illustrates the de-multiplexing side of the OTDL $150(a)$ discussed above in connection with FIG. 7. FIG. 8 illustrates wavelengths $124(a)$–$(f)$ arriving at a mirror 200 from the OTDL $150(a)$. Wavelength $124(e)$ preferably passes through the hole in mirror 200 for coupling to another fiber or to a detector. All the other wavelengths, $124(a)$–$(d)$ and $(f)$, are preferably reflected to a mirror 201.

While FIG. 6 showed an embodiment with one OTDL channel and one mirror and FIG. 7 showed an embodiment with two OTDL channels and two mirrors, an intermediate embodiment exists which utilizes two OTDL channels and only one mirror.

Figure 9:
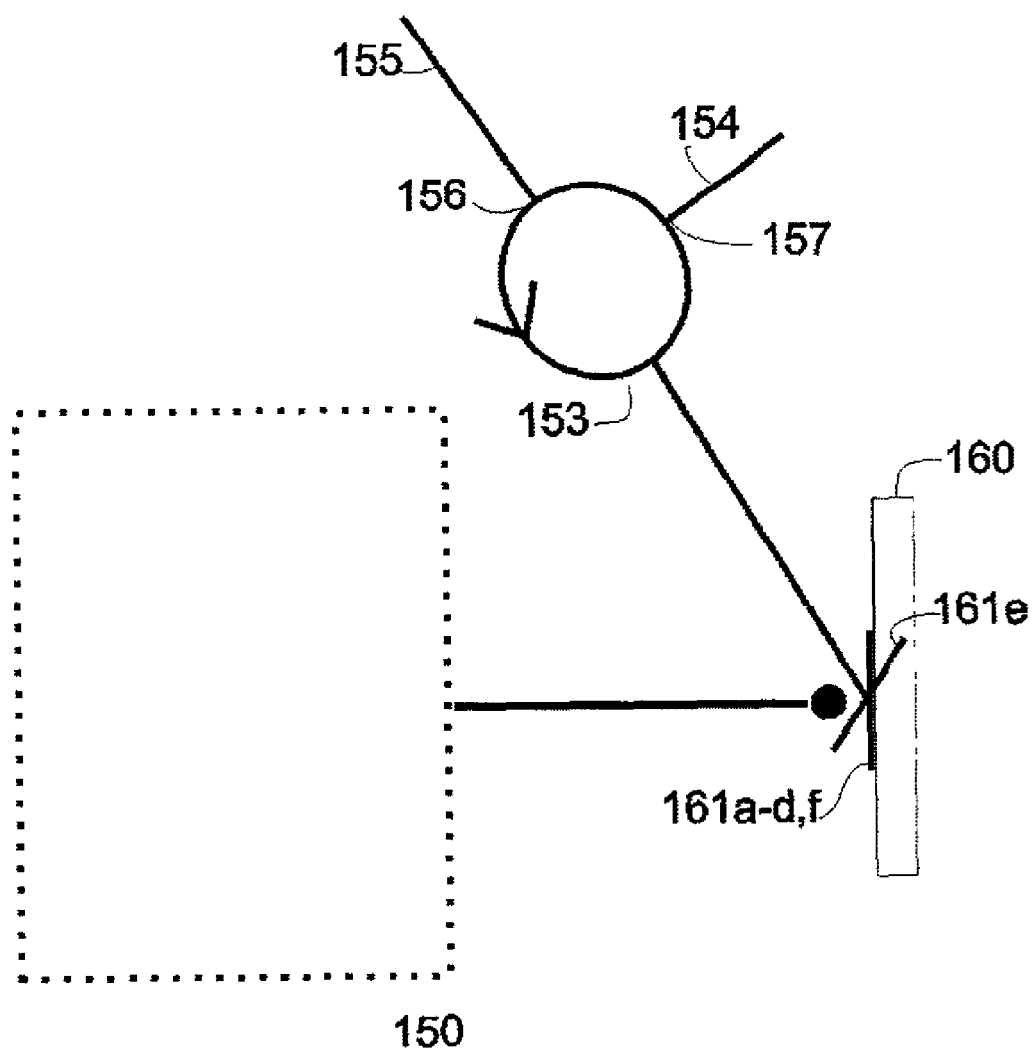
FIG. 9 is a top view of an example of a moveable mirror MEMS according to an embodiment of the invention.

FIG. 9 is a top view of a moveable mirror MEMS according to an embodiment of the invention. According to the embodiment shown in FIG. 9, mirror 160 discussed in connection with 160 may be replaced with a linear array of micromirrors using, for example, MEMS technology. All of the output wavelengths from the OTDL 150 preferably arrive at the MEMS device 160. A micro-mirror preferably may exist at each spatial location of each output beam, i.e., there are six mirrors, one for each wavelength 124(a)–(f), in this example. One of the micro-mirrors, shown as 161(e), for example, is rotated to reflect one of the wavelengths to a fiber/circulator 153 and then to a drop fiber 154. The optical signal to be inserted at the same wavelength (the added channel 155) is preferably coupled to the input port 156 of the circulator and passed back to the micro-mirror 161e, where the added wavelength is then reflected to the proper location of the OTDL 150.

It should be understood that while the above-description of the preferred embodiments of the invention as explained utilize a circulator. However, the present invention is not limited to using a circulator as described. Rather, any device which performs a function of separating/combining a bi-directionally propagating light beam into separate uni-directionally propagating beams may be used.

It should also be understood that while the embodiments described above use a mirror with a hole or holes for passing rather than light, any arrangement which performs a similar function, such as an optically, electrically or mechanically controlled port of any kind can be used so that light is selectively passed or reflected.

What is claimed:

1. A system comprising:
   a processor to process at least one collimated input beam to produce discrete multiple time-delayed output beams that interfere at a plane, the input beam comprising at least one frequency, the discrete multiple time-delayed output beams being mutually phase-shifted as a function of the at least one frequency of the input beam and being spatially distributed such that each of the discrete multiple time-delayed output beams occupies a discretely different region and each of the discrete multiple time-delayed output beams is individually weightable in complex amplitude, whereby the at least one input beam is channelized into constituent frequencies at the plane; and
   a subsystem to drop at least one wavelength from the at least one collimated input beam or to add at least one wavelength to the collimated input beam after the at least one input beam has been channelized.

2. The system of claim 1, wherein the processor comprises:
   a first reflective surface, and
   a second reflective surface, the second reflective surface having a reflectivity of less than 100%, the first reflective surface and the second reflective surface being in spaced relationship, whereby at least a portion of a beam directed toward the second surface is reflected multiple times between the first and second surfaces, thereby producing multiple time-delayed output beams exiting the second surface.

3. The system of claim 2, comprising:
   an optical system to operate on the multiple time-delayed output beams exiting the second surface to channelize the at least one input beam into constituent frequencies.

4. The system of claim 1, wherein the subsystem comprises a port where light is selectively passed or reflected.

5. The system of claim 4, further comprising:
   a fiber coupled to a target wavelength passed through the port; and
   an optical device coupled to the fiber to receive the target wavelength passed through the port and to pass the target wavelength on another fiber optic path.

6. The system of claim 5, wherein an optical signal to be added is coupled to a target wavelength at the optical device and the coupled wavelength passes back through the port and is coupled to an output fiber.

7. The system of claim 4, further comprising a detector to receive a target wavelength after the target wavelength passes through the port and to convert the target wavelength to an electronic signal.

8. The system of claim 1, further comprising
   a first mirror having at least one hole,
   a second mirror having at least one hole,
   the first mirror and the second mirror being mutually arranged such that the hole in the first mirror enables light to exit as a dropped wavelength and the hole in the second mirror enables light to enter as an added wavelength.

9. The system of claim 1, wherein the subsystem comprises a micro-electro-mechanical system having a plurality of micro-mirrors each positioned at a spatial location corresponding to a spatial location of the channelized input beam.

10. The system of claim 9, wherein at least one of the micro-mirrors is canted at an angle to reflect at least one target wavelength to an optical device.

11. The system of claim 10, wherein an optical signal to be added is coupled to the target wavelength at the optical device.

12. A method comprising:
    providing at least one collimated input beam, the at least one input beam comprising at least one frequency;
    processing the at least one input beam to produce discrete multiple time-delayed output beams that interfere at a plane, the discrete multiple time-delayed output beams being mutually phase-shifted as a function of the at least one frequency of the input beam and being spatially distributed such that each of the discrete multiple time-delayed output beams occupies a discretely different region and each of the discrete multiple time-delayed output beams is individually weightable in complex amplitude, whereby the at least one input beam is channelized into constituent frequencies at the plane; and
    adding or dropping at least one wavelength from the at least one collimated input beam after the at least one input beam has been channelized.

13. The method of claim 12, further comprising:
    providing a first reflective surface,
    providing a second reflective surface, the second reflective surface having a reflectivity of less than 100%, and
    positioning the first reflective surface and the second reflective surface so that at least a portion of a beam directed toward the second surface is reflected multiple times between the first and second surfaces, thereby producing multiple time-delayed output beams exiting the second surface.

14. The method of claim 13, further comprising:
    operating on the multiple time-delayed output beams exiting the second surface to channelize the at least one input beam into constituent frequencies.

15. The method of claim 14, wherein the dropping comprises:
    providing a linear array of micro-mirrors, each positioned at a spatial location corresponding to a spatial location of the channelized input beam;
    receiving, at the plurality of micro-mirrors, all channelized input beams;

rotating the micro-mirror corresponding to the targeted wavelength to be dropped to reflect the targeted wavelength to an optical system; and passing the targeted wavelengths to a drop fiber.

16. The method of claim 12, wherein the dropping comprises:

providing a port where light is selectively passed or reflected, wherein separated wavelengths from the input beams pass through the port;

collecting each wavelength passing through the port by a coupled fiber;

passing the collected wavelengths through a combining/separating device for separating or combining a bi-directionally propagating light beam into separate uni-directionally propagating light beams; and passing the each wavelength from the combining/separating device to a drop fiber.

17. The method of claim 16, wherein the combining/separating device is a circulator.

18. The method of claim 12, wherein the adding comprises:

providing a port where light is selectively passed or reflected, wherein separated wavelengths from the input beams pass through the port;

collecting each wavelength passing through the port by a coupled fiber;

passing the collected wavelengths through a combining/separating device for separating or combining a bi-directionally propagating light beam into separate uni-directionally propagating light beams;

coupling at least one added wavelength to the collected wavelengths at the combining/separating device; and passing the coupled wavelengths back through the port.

19. The method of claim 12, wherein the dropping comprises:

providing a first port where light is selectively passed or reflected, wherein separated wavelengths from the input beams pass through the first port;

passing the wavelengths which do not pass through the first port to a second port; and passing the each wavelength which passes through the first port to a drop fiber.

20. The method of claim 12, wherein the adding comprises:

providing a first port where light is selectively passed or reflected, wherein separated wavelengths from the input beams pass through the first port; and reflecting all wavelengths not passed through the first port to a second port where light is selectively passed or reflected;

receiving, at the second port, an optical signal carrying a frequency to be added to one of the wavelengths not passed through the first port; and combining the optical signal to one of the wavelengths not passed through the first port.

21. The method of claim 12, wherein the adding comprises:

providing a linear array of micro-mirrors, each positioned at a spatial location corresponding to a spatial location of the channelized input beam;

receiving, at the plurality of micro-mirrors, all channelized input beams;

rotating the micro-mirror corresponding to the targeted wavelength to reflect the targeted wavelength to an optical system; and coupling at least one an added wavelength to the collected wavelength at the optical system; and passing the coupled wavelengths back to the respective micro-mirror.

22. An optical add/drop system comprising a demultiplexing/multiplexing subsystem to select and recombine an appropriate wavelength and an add/drop apparatus to route the wavelength to a desired optical fiber output, wherein the demultiplexing/multiplexing subsystem channelizes a plurality of discrete input beams into their constituent frequency components at independent spatial locations to produce discrete multiple time-delayed output beams that interfere at a plane, the discrete multiple time-delayed output beams being mutually phase-shifted as a function of the at least one frequency of the input beam and being spatially distributed such that each of the discrete multiple time-delayed output beams occupies a discretely different region and each of the discrete multiple time-delayed output beams is individually weightable in complex amplitude, and the add/drop apparatus can add or drop multiple wavelengths from multiple channels with separations between 50 MHz and 25 GHz without using gratings or filters.

* * * * *